United States Patent
Bono (10) Patent No.: US 10,419,569 B2
(45) Date of Patent: Sep. 17, 2019

(54) INFORMATION PROCESSING FOR NATIVE CONTROL AND WEB FUNCTION WITH A PROXY PROCESSOR

(71) Applicant: DeNA Co., Ltd., Tokyo (JP)

(72) Inventor: Hironori Bono, Tokyo (JP)

(73) Assignee: DENA CO., LTD., Tokyo (JP)

( * ) Notice: Subject to any disclaimer, the term of this patent is extended or adjusted under 35 U.S.C. 154(b) by 139 days.

(21) Appl. No.: 15/205,992

(22) Filed: Jul. 8, 2016

(65) Prior Publication Data

US 2018/0013849 A1 Jan. 11, 2018
US 2018/0278709 A9 Sep. 27, 2018

(30) Foreign Application Priority Data

Jul. 9, 2015 (JP) ................ 2015-137560

(51) Int. Cl.
*G06F 15/16* (2006.01)
*H04L 29/08* (2006.01)
*H04L 29/06* (2006.01)

(52) U.S. Cl.
CPC .......... *H04L 67/2823* (2013.01); *H04L 67/02* (2013.01); *H04L 67/42* (2013.01)

(58) Field of Classification Search
CPC .. G06F 17/30893; G06F 17/212; A63F 13/12; A63F 2300/402; H04L 12/2898; H04L 41/0803
USPC ........ 709/203, 205–208, 217–219, 223, 238; 715/234, 239, 780
See application file for complete search history.

(56) References Cited

U.S. PATENT DOCUMENTS

| | | | | |
|---|---|---|---|---|
| 6,721,804 B1* | 4/2004 | Rubin | ............... | G06F 17/30873 707/E17.111 |
| 8,103,723 B1* | 1/2012 | Stewart | ............... | G06Q 10/107 709/205 |
| 8,429,261 B2* | 4/2013 | Bhattacharjee | ....... | H04L 67/025 709/223 |
| 8,543,726 B1* | 9/2013 | Kann | .................. | H04L 63/0281 709/219 |

(Continued)

FOREIGN PATENT DOCUMENTS

| | | |
|---|---|---|
| JP | 2014-507023 | 3/2014 |
| JP | 2015-022539 | 2/2015 |

OTHER PUBLICATIONS

Notice of Reasons for Rejection for JP App No. 2015-137560 dated Oct. 20, 2015, 4 pgs.

*Primary Examiner* — Dustin Nguyen
*Assistant Examiner* — Hao H Nguyen
(74) *Attorney, Agent, or Firm* — Procopio, Cory, Hargreaves & Savitch LLP (57) ABSTRACT

A web view processor performs processing by utilizing a web browser function, and a native view processor performs processing without utilizing a web browser function. A request for information is sent from the web view processor, via a proxy processor, to a server that is connected to an information communication network. Information is acquired at the proxy processor from the server in response to the request, the information is stored in a memory, the information is converted at the proxy processor into a format that can be processed by the native view processor, and the information whose format was converted is transmitted from the proxy processor to the native view processor.

5 Claims, 5 Drawing Sheets

(56) References Cited

U.S. PATENT DOCUMENTS

| | | | |
|---|---|---|---|
| 2003/0121983 A1* | 7/2003 | Herle | G06F 17/30905 235/472.01 |
| 2005/0097178 A1* | 5/2005 | Bala | H04L 63/126 709/207 |
| 2007/0239911 A1* | 10/2007 | Finnerty | H04L 67/025 710/65 |
| 2013/0086467 A1* | 4/2013 | Weber | H04W 4/18 715/239 |
| 2013/0159394 A1* | 6/2013 | Labour | G06F 9/44526 709/203 |
| 2013/0191509 A1* | 7/2013 | Loughry | G06F 9/541 709/219 |
| 2014/0143386 A1* | 5/2014 | Sokoryansky | H04L 67/32 709/219 |
| 2015/0121193 A1* | 4/2015 | Beveridge | G06F 17/30893 715/234 |
| 2015/0341467 A1* | 11/2015 | Lim | H04L 67/02 709/203 |

* cited by examiner

INFORMATION PROCESSING FOR NATIVE CONTROL AND WEB FUNCTION WITH A PROXY PROCESSOR

The present application claims the benefit of Japanese Patent Application No. 2015-137560, filed on Jul. 9, 2015, the content of which is incorporated herein in its entirety by reference.

BACKGROUND

1. Field

The present invention relates to an information processing device and an information processing program (e.g., non-transitory computer readable medium having machine-executable instructions with which a computer having a storage and a hardware processor).

2. Related Art

In electronic games and the like, processing such as the drawing of images is performed with an executable native application in combination with a specific information processing terminal and an OS, without relying on the function of a web browser. When a native application is used, the screen layout and other such design aspects are more complicated than when the processing is performed by a web view using a web browser function. Also, when the native application of a smartphone is updated, approval is required from the company that operates the platform that provides the application, etc., which means that the update processing entails more work, and the update takes more time.

In view of this, there is a known native application that performs screen display by combining an image drawn by a web view and an image drawn by a native view. A technique has also been proposed in which a program written in high-level programming language such as Javascript (registered trademark) is downloaded and converted into native code, which allows a native application to be easily updated (Patent Literature 1, etc.).

PRIOR ART DOCUMENTS

Patent Document

[Patent Document 1] Japanese Translation of Japanese Application Publication No. 2014-507023

SUMMARY OF THE INVENTION

Problems to be Solved by the Invention

However, since processing by a web view and processing by a native view are independent processes, it takes time to transfer data downloaded by the web view to the native view. Also, the format of data downloaded by the web view must be converted in order to process it in the native view. Accordingly, a problem is that it takes a long time from a processing command until the data is actually processed. This problem is particularly pronounced when no lag is tolerated in the reproduction of audio or image drawing in electronic games and the like.

SUMMARY

One aspect of the present invention is an information processing device that performs processing with: a first information processing means for performing processing by utilizing a web browser function; and a second information processing means for performing processing without utilizing a web browser function, said information processing device comprising: an external information requesting means for transmitting a request for information from the first information processing means, via a proxy, to an external server connected by an information network; an information acquisition means for acquiring information from the external server at the proxy in response to this request, and storing the information in a memory; an information conversion means for converting the information at the proxy into a format that can be processed by the second information processing means; and a native-use information transmission means for transmitting the information whose format was converted by the information conversion means from the proxy to the second information processing means.

Another aspect of the present invention is an information processing program (e.g., non-transitory computer readable medium having machine-executable instructions with which a computer having a storage and a hardware processor) that includes: a first information processing means for performing processing by utilizing a web browser function; and a second information processing means for performing processing without utilizing a web browser function, and said information processing program directs a computer to operate as: an external information requesting means for transmitting a request for information from the first information processing means, via a proxy, to an external server connected by an information network; an information acquisition means for acquiring information from the external server at the proxy in response to this request, and storing the information in a memory; an information conversion means for converting the information at the proxy into a format that can be processed by the second information processing means; and a native-use information transmission means for transmitting the information whose format was converted by the information conversion means from the proxy to the second information processing means.

Another aspect of the present invention is an information processing method for performing, in an information processing device: a first step of transmitting a request for information from a first information processing means that performs processing by utilizing a web browser function, via a proxy, to an external server connected by an information network; a second step of acquiring information from the external server at the proxy in response to this request, and storing the information in a memory; a third step of converting the information at the proxy into a format that can be processed by a second information processing means that performs processing without utilizing a web browser function; and a fourth step of transmitting the information whose format was converted by the information conversion means from the proxy to the second information processing means.

The request here preferably includes a delete command indicating whether or not to delete the information from the proxy after the information has been sent from the proxy to the native view in the native-use information transmission means, and if the delete command is a command to delete, the proxy deletes the information from the memory after the information has been sent from the proxy to the native view.

Also, it is preferable if an access information transmission means is provided for transmitting, from the web view to the native view, access information for accessing the information whose format has been converted by the information conversion means, and the native-use information transmission means transmits, from the proxy to the native view, the information whose format has been converted by the information conversion means when accessed using the access information from the native view.

It is also preferable if the request includes information specifying the method for converting from the format of the information utilized in the first information processing means to the format of the information utilized in the second information processing means.

Effects of the Invention

With the present invention, information supplied for processing in native view can be easily acquired, and the processing time in native view can be shortened.

DETAILED DESCRIPTION

Figure 1:
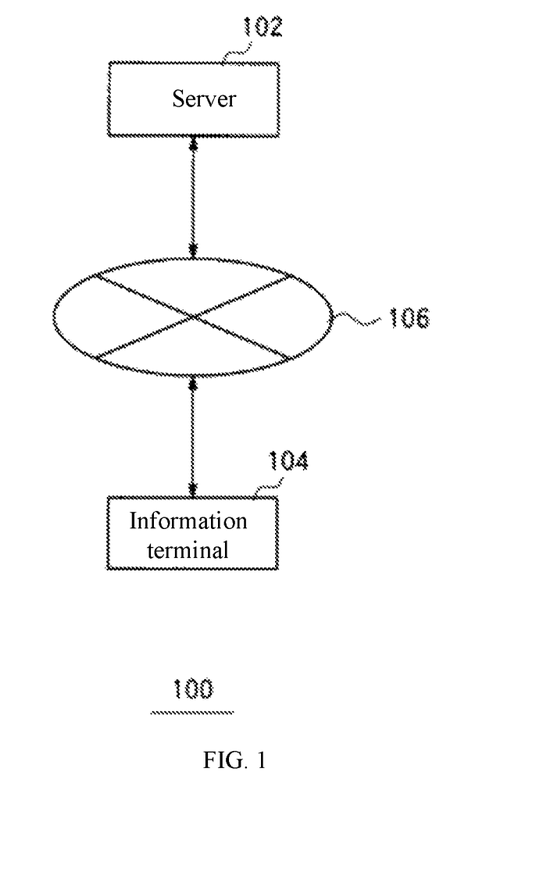
FIG. 1 illustrates a diagram illustrating the configuration of an information processing system in an embodiment of the present invention.

As shown in FIG. 1, an information processing system 100 in an embodiment of the present invention includes a server 102 and a client 104.

The server 102 and the client 104 are connected via the Internet or another such information communication network 106 so that information can be exchanged.

Figure 2:
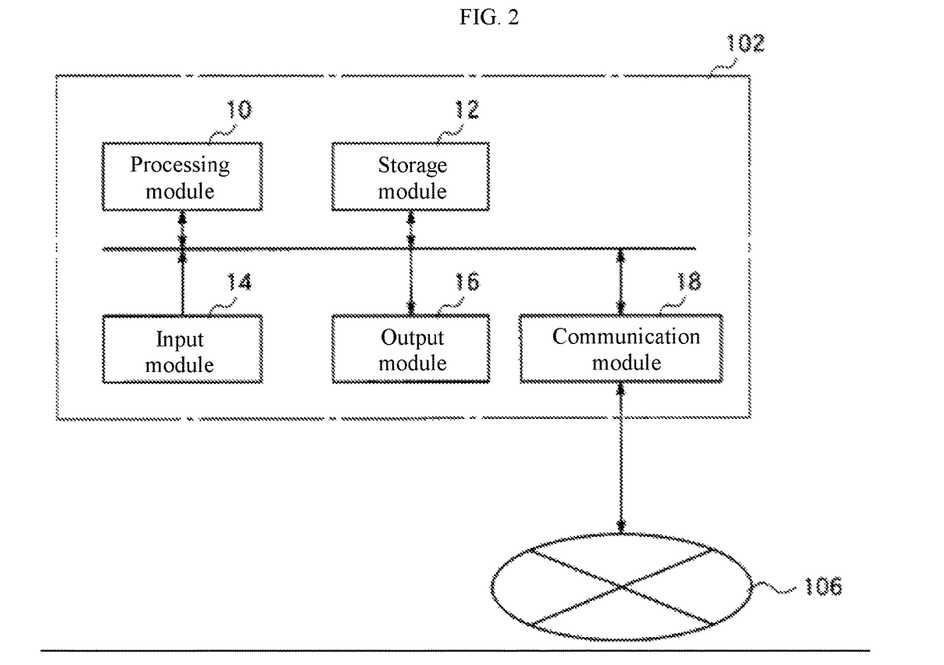
FIG. 2 illustrates a diagram illustrating the configuration of a server in an embodiment of the present invention.

As shown in FIG. 2, the server 102 includes a processing module 10, a storage module 12, an input module 14, an output module 16, and a communication module 18. The processing module 10 includes means for performing arithmetic processing, such as a CPU, or the like. The processing module 10 functions as a server that executes server programs (e.g., non-transitory computer readable medium having machine-executable instructions with which a computer having a storage and a hardware processor) stored in the storage module 12 and thereby transmits information such as that used for updating applications in an information processing system in this embodiment. The storage module 12 includes storage means, such as a semiconductor memory, a memory card, or the like. The storage module 12 is accessibly connected to the processing module 10 and stores server programs and the information required for their processing. The input module 14 includes means for entering information. The input module 14 has, for example, a keyboard, a touchscreen panel, buttons, or the like for receiving input from the administrator. The output module 16 includes a user interface screen (UI), etc., for accepting input information from the administrator and means for outputting the results of processing by the server 102. The output module 16 is provided with a display that, for example, presents images to the administrator. The communication module 18 includes an interface for exchanging information with the client 104 via the information communication network 106. The communication module 18 may be wired or wireless.

Figure 3:
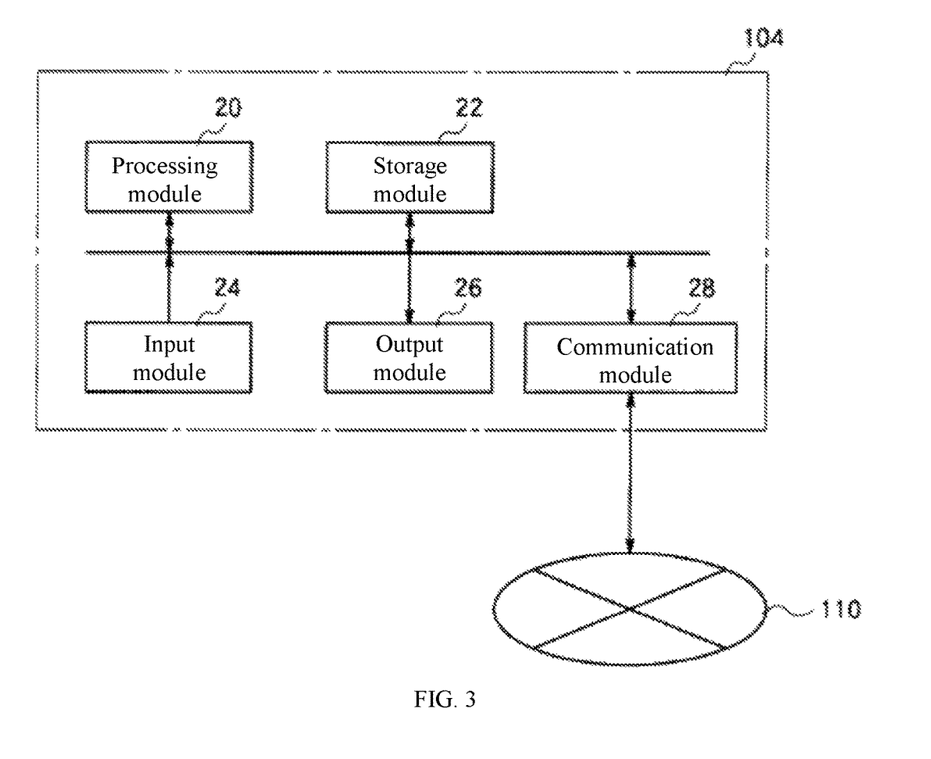
FIG. 3 illustrates a diagram illustrating the configuration of a client in an embodiment of the present invention.

As shown in FIG. 3, the client 104 includes a processing module 20, a storage module 22, an input module 24, an output module 26, and a communication module 28. The processing module 20 includes means for performing arithmetic processing, such as a CPU, or the like. The processing module 20 functions as a client in the information processing system in this embodiment by executing client programs (e.g., non-transitory computer readable medium having machine-executable instructions with which a computer having a storage and a hardware processor) stored in the storage module 22. Client programs shall be considered to include native applications that include a web processing program that performs processing by utilizing the function of a web browser, and a native processing program that performs processing by combining the client 104 with the OS installed therein, without utilizing the function of a web browser. The storage module 22 includes storage means, such as a semiconductor memory, a memory card, or the like. The storage module 22 is accessibly connected to the processing module 20 and stores the client programs and the information required for their processing. The input module 24 includes means for entering information. The input module 24 has, for example, a keyboard, a touchscreen panel, buttons, or the like for receiving input from the user. The output module 26 includes means for outputting information that is required for processing at the client 104, such as a screen presenting posted information, or a user interface screen (UI) for receiving input information from the user. The output module 26 is provided with a display that, for example, presents images to the user. The communication module 28 includes an interface for exchanging information with the server 102 via the information communication network 106. The communication module 28 may be wired or wireless.

In this embodiment, we will describe an example of performing processing that is a combination of image drawing processing done by a web view processor 30 that makes use of the display function of a web browser, and image drawing processing done by a native view processor 32 that does not make use of the display function of a web browser. Also, in this embodiment, as shown in the functional block diagram in FIG. 4, the web view processor 30 and the native view processor 32 are not directly connected to the external server 102, and instead acquire information such as that used for image display via a proxy processor 34.

Figure 5:
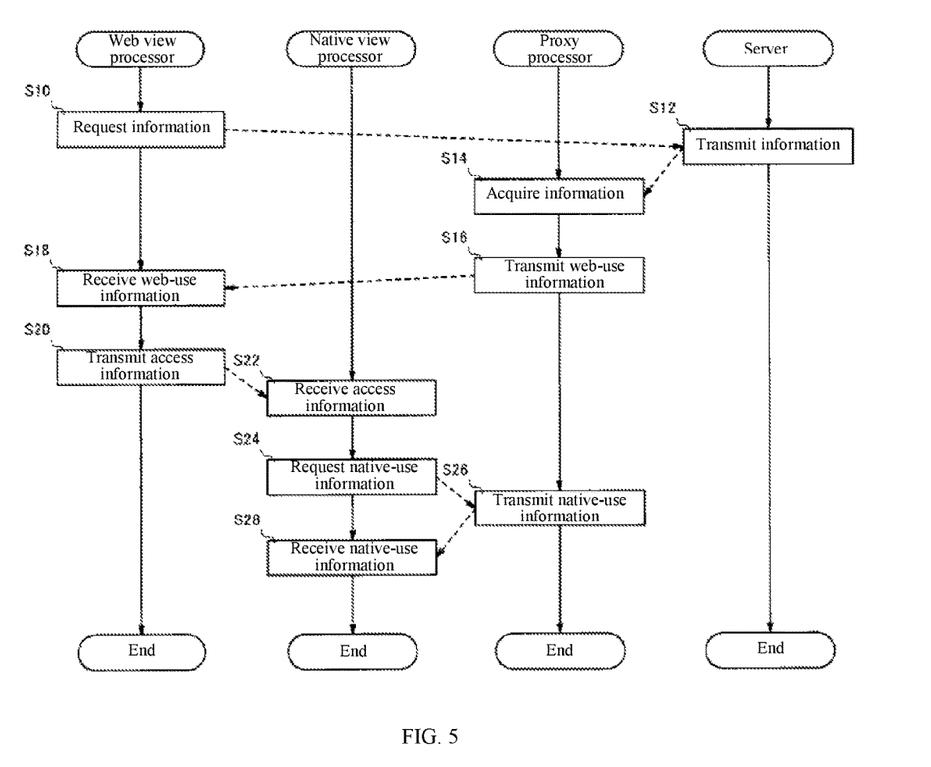
FIG. 5 illustrates a flow chart used to illustrate the information processing in an embodiment of the present invention.

The processing in an embodiment of the present invention will be illustrated below with reference to the flow chart of FIG. 5.

In step S10, a request for new information (resources) required to display an image is sent from the web view processor 30 to the server 102. The processing in this step causes the client 104 to function as an external information requesting means. The web view processor 30 transmits information required for image display via the proxy processor 34 to the server 102. At this point, let us assume that the requested information includes information used by the web view processor 30 (hereinafter referred to as web-use information), and information used by the native view processor 32 (hereinafter referred to as native-use information).

A request for resources is made by designating an identifier for specifying information. This identifier can be, for example, a URL for obtaining the requested information.

Also, it is preferable if the request includes a delete command indicating the method for converting from a web view file format to a data format used in native view (if an image, this includes identification of the data such as raster or vector, the file format used by web view (JPG, PNG, etc.), the data format used by native view (4096-color texture, also referred to as "4096-color palette", full-color texture, also referred to as "full-color palette", etc.), and if audio, this includes the file format such as MP3 or AAC, the data format used by native view, etc.), and the method for deleting the information. It is preferable if the delete command indicates whether or not to delete the native-use information from the cache area of the storage module 22 after the native-use information has been sent from the proxy processor 34 to the native view processor 32 in the processing discussed below.

In step S12, the requested information is transmitted from the server 102 to the client 104. Upon receiving a request transmitted from the client 104 via the proxy processor 34, the server 102 transmits the requested information to the client 104. The processing in this step causes the server 102 to function as a server information transmission means.

In step S14, the information transmitted from the server 102 is received by the client 104. The client 104 receives the information transmitted via the proxy processor 34 from the server 102, and stores the received information in the cache area of the storage module 22. The processing of this step causes the client 104 to function as an information acquisition means.

At the same time, the proxy processor 34 performs processing to convert the native-use information (out of the information received) into a format that can be processed by the native view processor 32. The proxy processor 34 stores the native-use information that has undergone this format conversion in the cache area of the storage module 22. As a result, the proxy processor 34 functions as an information conversion means.

In step S16, web-use information is transmitted to the web view processor 30. The proxy processor 34 transmits the web-use information utilized by the web view processor 30 (out of the information received and cached in step S14) to the web view processor 30. The processing of this step causes the proxy processor 34 to function as a web-use information transmission means.

Furthermore, in this embodiment, access information used by the native view processor 32 to acquire native-use information is transmitted from the proxy processor 34 to the web view processor 30. Specifically, access information used by the native view processor 32 to access native-use information whose format has been converted by the proxy processor 34 in step S14, such as a URL indicating the storage area in which native-use information is held in the storage module 22, is transmitted from the proxy processor 34 to the web view processor 30.

In step S18, web-use information is received by the web view processor 30. The web view processor 30 receives the web-use information transmitted from the proxy processor 34 in step S16. The processing of this step causes the web view processor 30 to function as a web-use information reception means.

The web view processor 30 can perform processing using web-use information acquired from the proxy processor 34. In this embodiment, the web view processor 30 forms an image from the web-use information acquired using a web view function, and causes the output module 26 (a display, touch panel, etc.) to display this image.

Also, in this embodiment, the web view processor 30 receives access information transmitted from the proxy processor 34.

In step S20, access information is transferred from the web view processor 30 to the native view processor 32. The web view processor 30 transfers the access information received from the proxy processor 34 in step S16 to the native view processor 32. The processing of this step causes the web view processor 30 to function as an access information transmission means.

In step S22, access information is received by the native view processor 32. The native view processor 32 receives the access information transmitted from the web view processor 30 in step S20. The processing in this step causes the native view processor 32 to function as an access information reception means.

In step S24, a request is sent to transmit native-use information from the native view processor 32 to the proxy processor 34. The native view processor 32 transmits a request to transmit native-use information to the proxy processor 34 along with the access information received in step S22. The processing of this step causes the native view processor 32 to function as a native-use information requesting means.

In step S26, the native information requested by the native view processor 32 is transmitted from the proxy processor 34 to the native view processor 32. The proxy processor 34 receives the access information and the request transmitted from the native view processor 32 in step S24, then reads native-use information from the storage area of the cache specified by access information according to the request, and transmits this native-use information to the native view processor 32. The processing of this step causes the proxy processor 34 to function as a native-use information transmission means.

If a delete command indicating the method for deleting information was included in the request transmitted to the server 102 in step S10, the native-use information is deleted from the cache area of the storage module 22 according to this delete command after the native-use information has been sent from the proxy processor 34 to the native view processor 32. More specifically, if the request in step S10 was a delete command to delete the native-use information held in the storage area specified by the access information, the proxy processor 34 transmits this information to the native view processor 32 and deletes it from the cache area of the storage module 22.

In step S28, native-use information is received by the native view processor 32. The processing of this step causes the native view processor 32 to function as a native-use information reception means. The native view processor 32 receives the native-use information transmitted from the proxy processor 34 in step S26. The native view processor 32 can perform processing by using the native-use information acquired from the proxy processor 34. In this embodiment, the native view processor 32 forms an image from native-use information acquired using a native view function, and causes the output module 26 (a display, touch panel, etc.) to display this image. At this point, since the native-use information has been converted by the proxy processor 34 in step S14 into a format that can be processed by the native view processor 32, the time it takes the native view processor 32 to process image display can be shortened.

In this embodiment, access information was used to transmit a request for native-use information from the native view processor 32 to the proxy processor 34, but this is not the only option. For instance, when the proxy processor 34 receives native-use information, push processing may be performed to automatically transmit the native-use information to the native view processor 32 after processing such as format conversion has been performed.

Figure 4:
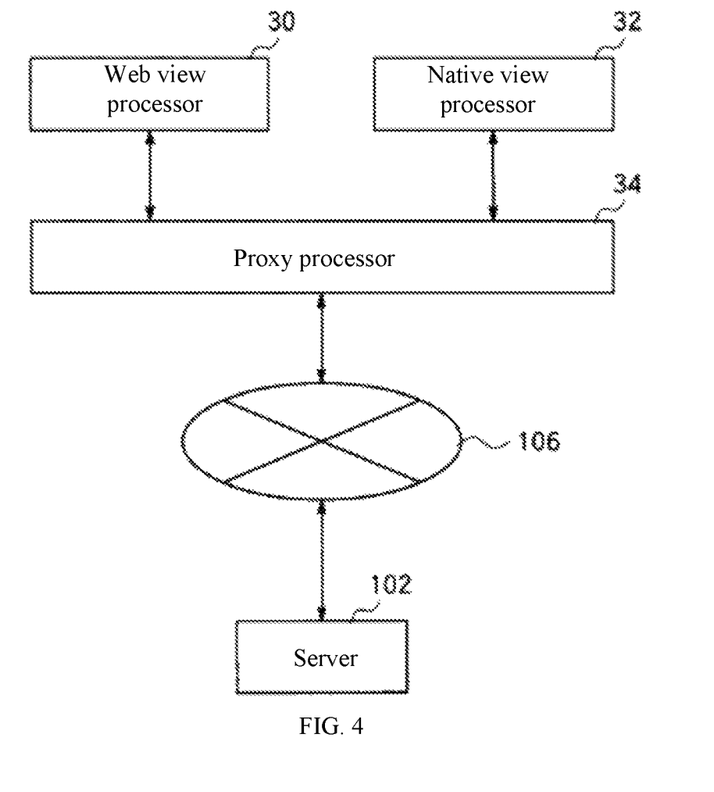
FIG. 4 illustrates a functional block diagram illustrating the configuration of the information processing system in an embodiment of the present invention.

As discussed above, with the information processing system 100 in this embodiment, native-use information processed by the native view processor 32 is supplied from the server 102 in response to a request for information from the web view processor 30. The information supplied for processing in the native view processor 32 can thus be acquired via the proxy processor 34, without transmitting a request for information from the native view processor 32 to the external server 102. Consequently, in a native application for a smart phone or the like, the information necessary for updating can be acquired from the server 102 operated by the company that operates the platform that provides the application, without having to ask this company for approval.

Also, the processing performed by the web view processor 30 is independent from processing performed by the native view processor 32, but the format of the native-use information transmitted from the server 102 at the request of the web view processor 30 can be converted ahead of time by the proxy processor 34. Consequently, the time it takes to actually process the data at the native view processor 32 can be shortened. In particular, when no lag is tolerated in the reproduction of audio or image drawing in electronic games and the like, the processing speed can be increased.

DESCRIPTION OF THE REFERENCE NUMERALS

10 Processing module, 12 Storage module, 14 Input module, 16 Output module, 18 Communication module, 20 Processing module, 22 Storage module, 24 Input module, 26 Output module, 28 Communication module, 30 Web view processor, 32 Native view processor, 34 Proxy processor, 100 Information processing system, 102 Server, 104 Client

The invention claimed is:

1. An information processing device, comprising:
a memory;
a first information processor that performs processing by utilizing a web browser function;
a second information processor that performs processing without utilizing a web browser function; and
a proxy processor;
wherein the first information processor is configured to transmit a request for information to an external server connected by an information network, via the proxy processor;
wherein the proxy processor is configured to:
acquire the information from the external server in response to the request, and store the information in the memory, the information comprising web-use information used by the first information processor, and native-use information;
transmit the web-use information to the first information processor;
convert the native-use information into a format that can be processed by the second information processor as the native-use information is acquired and stored in the memory, the converted native-use information being stored in the memory by the proxy processor;
transmit the converted native-use information from the memory to the second information processor; and
wherein the proxy processor transmits access information for accessing native-use information to the first information processor;
the proxy processor transmits converted native-use information to the second information processor when the access information is provided from the second information processor;
wherein the access information is transferred from the first information processor to the second information processor.

2. The information processing device according to claim 1,
wherein the request includes a delete command indicating whether or not to delete the converted native-use information in the memory, after the converted native-use information has been sent from the proxy processor to the second information processor, and
if the delete command is a command to delete, the proxy processor deletes the converted native-use information from the memory after the converted native-use information has been sent from the proxy processor to the second information processor.

3. The information processing device according to claim 1,
wherein the request includes information specifying a method used for converting from a format of the information utilized in the first information processor to the format of the information utilized in the second information processor.

4. An non-transitory computer readable medium having machine-executable instructions with which a computer having a storage and a hardware processor, configured to perform information processing, the instructions comprising:
a first information processor that performs processing by utilizing a web browser function;
a proxy processor; and
a second information processor that performs processing without utilizing a web browser function,
said instructions directing the proxy processor performing instructions of:
transmitting a request for information from the first information processor to an external server connected by an information network;
acquiring the information from the external server in response to the request, and storing the information in a memory, the information comprising web-use information used by the first information processor, and native-use information;
transmitting the web-use information to the first information processor;
converting the native-use information into a format that can be processed by the second information processor as the native-use information is acquired and stored into memory, the converted native-use information being stored in the memory by the proxy processor;
transmitting the converted native-use information from the memory to the second information processor; and
wherein the proxy processor transmits access information for accessing native-use information to the first information processor;
the proxy processor transmits converted native-use information to the second information processor when the access information is provided from the second information processor;
wherein the access information is transferred from the first information processor to the second information processor.

5. An information processing method for performing, in an information processing device:
transmitting, from a proxy processor, a request for information from a first information processor that performs processing by utilizing a web browser function, to an external server connected by an information network;

acquiring information from the external server at the proxy processor in response to the request, and storing the information in a memory, the information comprising web- use information used by the first information processor, and native-use information;

transmitting the web-use information to the first information processor;

converting the native-use information at the proxy processor into a format that can be processed by a second information processor that performs processing without utilizing a web browser function as the information is acquired and stored in the memory, the converted native-use information being stored in the memory by the proxy processor;

transmitting the converted native-use information to the second information processor; and wherein the proxy processor transmits access information for accessing native-use information to the first information processor;

the proxy processor transmits converted native-use information to the second information processor when the access information is provided from the second information processor;

wherein the access information is transferred from the first information processor to the second information processor.

* * * * *